United States Patent
Congard et al.

(10) Patent No.: US 7,489,443 B2
(45) Date of Patent: Feb. 10, 2009

(54) ROLL-UP PROJECTION SCREEN

(75) Inventors: Patrice Congard, Paris (FR); Daniel Bujon, Montfermeil (FR); Jean-Pierre Charrier, Sèvres (FR)

(73) Assignee: U. See Ltd., Ely, Cambridgeshire (GB)

( * ) Notice: Subject to any disclaimer, the term of this patent is extended or adjusted under 35 U.S.C. 154(b) by 0 days.

(21) Appl. No.: 11/818,516

(22) Filed: Jun. 14, 2007

(65) Prior Publication Data

US 2008/0002254 A1 Jan. 3, 2008

(30) Foreign Application Priority Data

Jun. 15, 2006 (FR) ................... 06 05307

(51) Int. Cl.
*G03B 21/56* (2006.01)
(52) U.S. Cl. ..................................... 359/461
(58) Field of Classification Search ............... 359/461; 160/241
See application file for complete search history.

(56) References Cited

U.S. PATENT DOCUMENTS 3,251,264 A * 5/1966 Jacobson ................. 359/461
2005/0162740 A1* 7/2005 Hou ........................ 359/461

FOREIGN PATENT DOCUMENTS

| EP | 1 154 395 | 11/2001 |
| JP | 05 273647 | 10/1993 |
| JP | 09 060429 | 3/1997 |
| JP | 2002 333672 | 11/2002 |

* cited by examiner

*Primary Examiner*—Christopher Mahoney
(74) *Attorney, Agent, or Firm*—Weingarten, Schurgin, Gagnebin & Lebovici LLP

(57) ABSTRACT

The front projection screen comprises firstly a support layer of substantially black color suitable for rolling onto a roll-up tube, and a weight at its bottom edge, and secondly a projection surface that is substantially white or pale gray, being smaller in size than said support layer, and being fastened to the support layer via a junction at its top edge and overlying the face of the screen that is to receive projection.

8 Claims, 5 Drawing Sheets

ROLL-UP PROJECTION SCREEN

This application claims priority to French application No. 06 05307 filed Jun. 15, 2006.

FIELD OF THE INVENTION

The field of the present invention is that of screens for projecting images, and in particular video images. More precisely, the invention relates to so-called "front" projection screens using a projector that is located on the same side of the projection surface as the spectators. More precisely, the invention relates to screens that can be retracted by being rolled up. Roll-up screens are generally constituted by a rectangular projection surface of flexible, textile or plastics material of a white or pale gray color that is fastened via an edge to a roll-up tube. The edge opposite to the fastened edge is generally weighed-down by a weight, so as to tension the projection surface when it is unrolled by rotating the roll-up tube.

BACKGROUND OF THE INVENTION

Such tensioning is necessary, firstly to enable the projection surface to be rolled up around the roll-up tube, and secondly to ensure the projection surface is plane when it is unrolled, which is a necessary condition for obtaining good quality projection.

This condition of planeness is achieved in part only by such a solution, since the sole force exerted on the projection surface is the force exerted by the weight in the vertical direction. This generally results in the unrolled projection surface being approximately plane, while presenting, in detail, two types of deformation: either a swelling in a low middle zone, or edges deformed into circular arcs.

Although such deformations are considered to be acceptable in numerous applications, they are unacceptable in other applications, in particular for home use, where a high level of image quality is required.

Devices suitable for exerting lateral tension on roll-up projection surfaces are known. In general, they comprise fastener tabs disposed at a predetermined pitch along the side edges of the projection surface. These tabs are connected to two tensioned strings on respective sides of the screen. The strings are themselves tensioned by vertical traction using a horizontal bar that also acts as a weight for the projection surface, so as to provide the necessary vertical tension.

The drawbacks of such a device are known. Such lateral tensioning devices are expensive to fabricate, often requiring manual adjustment. Furthermore they are unattractive, often leading to the side edges of the screen being subdivided into circular arcs. In addition, they require a roll-up tube that is considerably wider than the usable projection surface. Finally, they prevent or make difficult any modification to the adjustment at the end of the rolling stroke, determining the height of the bottom edge of the projection surface, and thus the vertical position of said surface.

Another defect also often affects the quality of the image projected onto a roll-up screen. Since the environment in which the screen is to be found can vary, it often happens that a pale surface lies behind the screen. This surface reflects some of the light coming from the projected image by virtue of transparency of the screen. This is particularly visible when the screen is perforated or woven so as to be permeable to sound. The light as reflected in this way returns by transparency and becomes superposed on the projected image, adding interference and thus making it less sharp.

To avoid that phenomenon, it is common practice to use a coating of black color on the rear face of the screen, serving to absorb light reflected by a wall situated behind the screen. Nevertheless, such a coating is particularly difficult to implement and expensive on a screen that is perforated or woven. It is difficult to paint only one face of such a porous surface black without changing the appearance of its other face, where said other face must necessarily remain white or pale gray. A known solution consists in rolling a second layer up simultaneously with the projection surface, the second layer being black or very dark gray and constituting an occultation layer, generally made of a material that is similar to the projection surface and presenting equivalent permeability to soundwaves. This layer is located behind the projection surface when the screen is unrolled. The extra cost is significant.

A characteristic that is desirable for screens that are for use with high quality video projection is to frame the projection surface with a black border, thereby reinforcing the perception of image contrast. Making such a black border, generally by painting the margins of the projection surface, has the drawback of involving extra cost.

OBJECTS AND SUMMARY OF THE INVENTION

A first object of the present invention is to propose a roll-up projection screen presenting a high degree of planeness when unrolled, but without making use of a lateral tensioning device.

A second object of the present invention is to propose a roll-up screen having an occultation layer that does not lead to extra cost during manufacture that is equivalent to doubling the projection surface.

A third object of the present invention is to propose a screen having a black frame around the projection surface without involving any extra cost.

In greater detail, a front projection screen according to the present invention comprises:

a support layer, of substantially black color, suitable for rolling onto a roll-up tube and including a weight at its bottom edge; and a projection surface that is substantially white or pale gray, smaller in size than said support layer, which projection surface is fastened to the support layer via a junction at its top edge and overlies the face of the screen that is to receive projection.

Preferably, the support layer and the projection surface are united by a junction extending across the width of the top edge of the projection surface.

The projection surface is positioned relative to the support layer in such a manner that the bottom edge of the support layer is perceptibly lower than the bottom edge of the projection surface when the screen is unrolled.

The support layer is also substantially taller than the projection surface, so that only said support layer connects the projection screen to the roll-up tube when said screen is unrolled.

Furthermore, said projection surface is not as wide as the support layer.

These three characteristics enable the occultation layer to be used to provide a visual frame around the projection surface, advantageously replacing a black margin painted on the periphery of the projection surface.

Said projection surface is preferably of substantially the same dimensions as the image it is desired to project on the screen.

The support layer and the projection surface each includes a respective weight extending over its entire width.

Preferably, said projection surface includes a weight that weighs less than that of the weight of said support layer.

Preferably, the weight of the projection surface is of a length that is substantially equal to the width of the bottom edge of the projection surface, and presents a cross-section that is oblong, constant over its entire length, and of a thickness less than three millimeters.

Thus, the weight of the projection surface does not lead to any significant deformation of the support layer.

Preferably, the support layer has at least one turn around the tube when the screen is in the unrolled position, and a start zone is to be found above the junction uniting the support layer and the projection surface.

Said start zone thus enables the height of the projection surface to be adjusted, by finely adjusting the end of the screen unrolling stroke.

BRIEF DESCRIPTION OF THE DRAWINGS

The objects, characteristics, and advantages of the invention appear from the description given below of an embodiment of the invention given by way of non-limiting illustration and with reference to the accompanying drawings, in which.

MORE DETAILED DESCRIPTION

Figure 1:
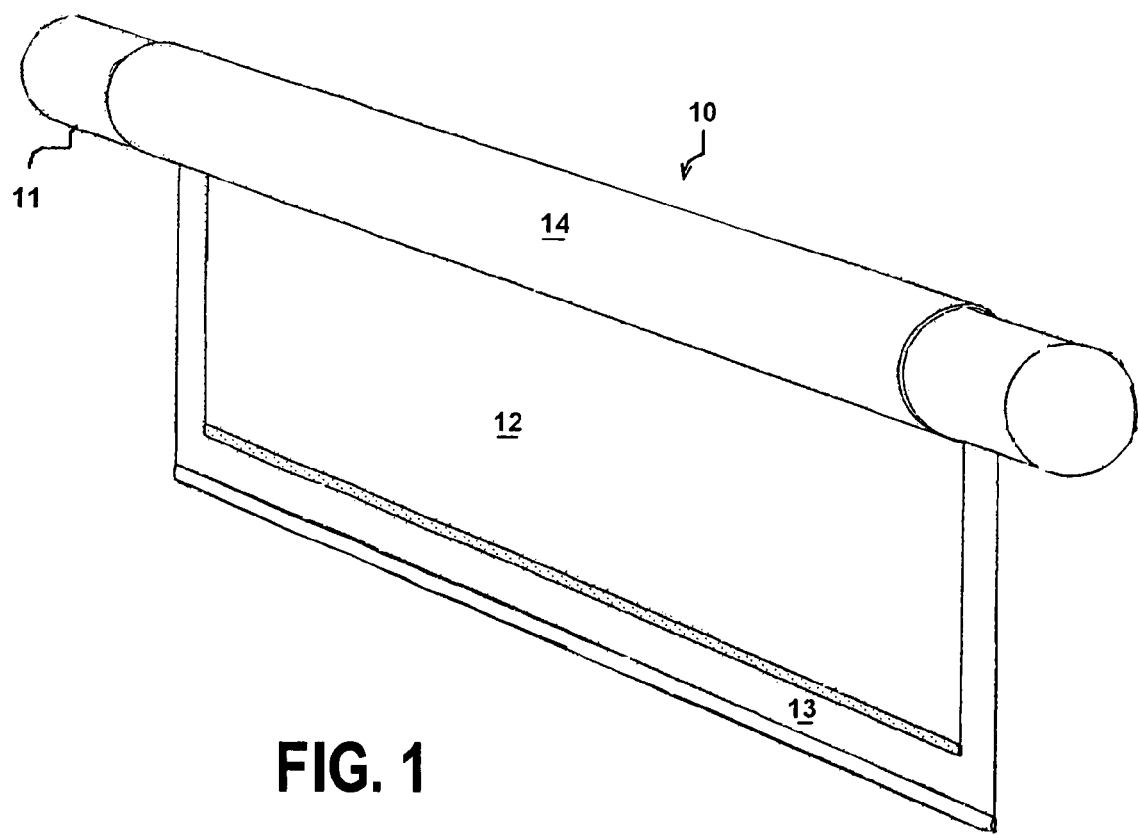
FIG. 1 is a general perspective view of a projection screen of the invention, seen from the projection side, the screen being in a partially rolled-up position.

In greater detail, and with reference to FIG. 1, a projection screen 10 of the invention is rolled up in part around a roll-up tube 11. Overall, the screen 10 comprises a projection surface 12 constituted by a thin sheet of flexible material.

Behind the projection surface 12 there is a so-called support layer 13 lying in a plane that is parallel and adjacent to the plane in which the projection surface 12 lies.

The support layer 13 is also constituted by a thin sheet of flexible material. In the embodiment shown by way of example, but in non-limiting manner, the support layer 13 is larger than the projection surface 12.

In FIG. 1, a portion 14 of the projection screen is rolled up, the support layer 13 and the projection surface 13 being superposed so that they are rolled together about the roll-up tube.

Figure 2:
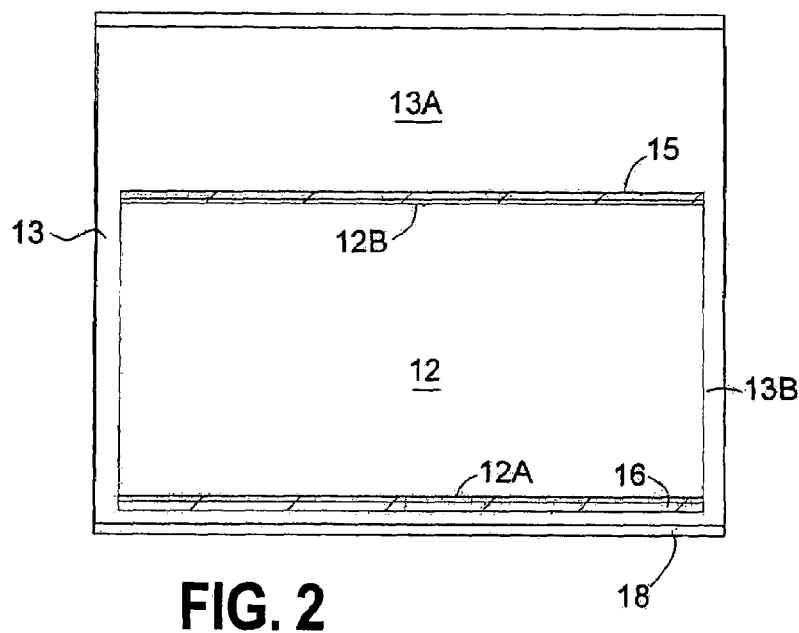
FIG. 2 is a front elevation view of a projection surface mounted on a support layer of the invention.
Figure 3:
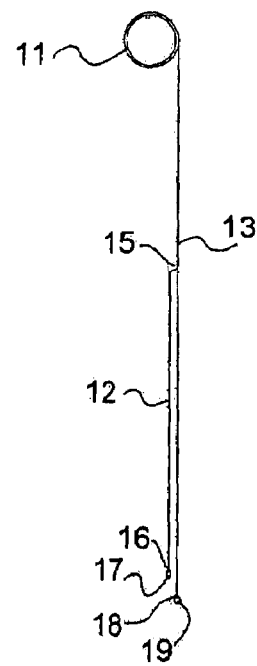
FIG. 3 is a side elevation view of a projection screen of the invention.

FIGS. 2 and 3 show the assembly constituted by the projection surface 12 and the support layer 13, when the assembly is unrolled. As shown in FIG. 2, both layers are rectangular, and they are disposed in such a manner that their edges are parallel.

It should be observed in FIG. 3 that the projection surface 12 is shown as being clearly separated from the support layer 13. This is solely to make the drawing understandable, since in practice, given that the projection surface 12 is suspended from a junction 15, it comes into contact with the support layer 13.

The support layer 13 is behind the projection surface 12. It is perceptibly larger than the projection surface, and comprises two portions: a top portion 13A; and a bottom portion 13B.

The projection surface 12 is superposed on the bottom portion 13B of the support layer and it is connected thereby by the junction 15. This junction 15 extends over the entire width of the top edge of the projection surface 12.

The junction 15 may equally well be constituted by stitching, adhesive, riveting, or heat-sealing, depending on the materials respectively constituting the support layer 13 and the projection surface 12.

The junction 15 is the only mechanical connection between the support 13 and the projection surface 12, the surface and the other three edges of the projection surface 12 being free.

In the embodiment described by way of example, the materials constituting the support layer 13 and the projection surface 12 are similar, but this characteristics is not limiting.

By way of example, they may be made of fabric, but other materials could be envisaged, such as a sheet of polyvinylchloride (PVC), or of some other plastics material.

In a preferred embodiment, the material constituting the projection surface 12 is a fabric made from composite yarn comprising a glass fiber core sheathed in PVC.

The support layer 13 is preferably substantially black.

The projection surface 12 may either be substantially white, or gray, depending on projection requirements.

Preferably, the thickness of said material constituting the projection surface 12 does not exceed 1 millimeter (mm).

Advantageously, the material constituting the support layer 13 is at least as thick as the projection surface 12.

In the example described, the material constituting the support layer 13 is the same as the material constituting the projection surface 12.

Preferably, the materials constituting the support layer 13 and the projection surface 12 are permeable to air in their finished appearance.

The bottom edge of the projection surface 12, i.e. its edge remote from the junction 15, is provided with a hem 16 extending over the entire width of said projection surface. A metal rod 17 of rectangular section extends across the entire width of the projection surface 12 and is located inside the hem 16.

Figure 4:
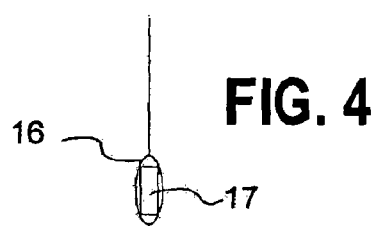
FIG. 4 is a detail view of FIG. 3.

With reference to FIG. 4, the hem 16 is made by folding over the bottom edge of the projection surface 12, said fold being secured to the rear face of said projection surface by stitching, by riveting, by adhesive, by heat-sealing, or by any appropriate means.

In similar manner, the bottom edge of the support layer 13, i.e. the edge of the support layer 13 that is closest to the bottom edge of the projection surface 12, is provided with a hem 18 extending over the entire width of the support layer. The hem 18 contains a metal rod 19 that extends over the entire width of the hem 18.

It should be observed that each of the rods 17 and 19 is of constant cross-section. Nevertheless, the cross-section of the rod 17 may differ from that of the rod 19, both in terms of area and in terms of shape.

In a preferred embodiment, the rod 17 presents an oblong cross-section of thickness lying in the range 2 mm to 3 mm and of height lying in the range 10 mm to 20 mm.

Preferably, the cross-section of the rod 19 is greater than that of the rod 17.

In a preferred embodiment, the rod 19 is a round steel rod with a diameter of 15 mm.

The rods 17 and 19 act as weights for vertically tensioning respectively the projection surface 12 and the support layer 13 when they are unrolled.

In other variant embodiments, it is possible to envisage various kinds of weight for exerting vertical tension respectively on the projection surface 12 and on the support layer 13, without going beyond the ambit of the invention. In particular, the weights may be secured directly to the edges of the projection surface and of the support layer, respectively.

Figure 5:
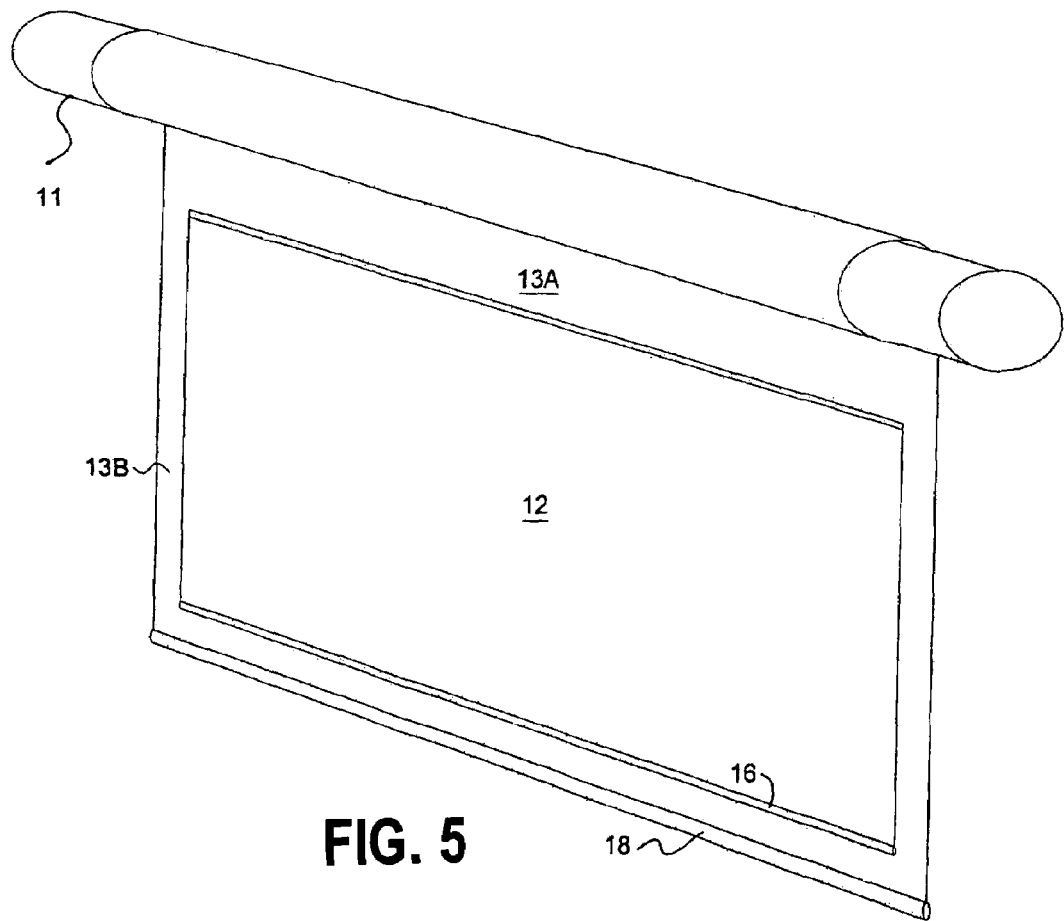
FIG. 5 is an overall perspective view of a projection screen of the invention seen from its projection side, when in the fully unrolled position.

In the embodiment described by way of example, with reference to FIG. 5, the support layer 13 is a little wider than the projection surface 12, and the bottom portion 13B extending vertically downwards from the junction 15 is a little taller than the projection surface 12, such that when looking at the screen from its front during projection, the support layer 13 appears to form a frame around the projection surface. A frame with a width lying in the range 5 centimeters (cm) to 10 cm around three sides of the projection surface, while the top portion of what looks like a substantially black frame constitutes a starter zone of the portion 13A, presenting a visible height that depends on the extent to which it is rolled onto the tube 11.

Preferably, a bottom strip 12A (shown shaded in FIGS. 2 and 6) of the projection surface 12 is painted using a color that is as close as possible to the color of the support layer 13, said strip extending over the entire width of the projection surface 12, and itself being of a width that is substantially equal to or very slightly greater than the width of the hem 16. Thus, the strip 12A of substantially black color defines the bottom end of the projection zone so that the end 16 lies outside said projection zone.

In similar manner, a top strip 12B (shown shaded in FIGS. 2 and 6) of the projection surface 12 is painted in a color that is as close as possible to the color of the support layer 13, said strip extending over the entire width of the projection surface 12, and itself being of a width that is substantially equal to or very slightly greater than the width of the junction 15.

The strips 12A and 12B defining said projection zone thus ensure that none of the unevenness visible in the projection surface 12 actually receives the projected image when the screen is in use. In addition, since the color of the strips 12A and 12B is very close to the color of the support layer 13, it is substantially black, thereby having the effect of masking any uneven appearance due to the junction 15 and to the hem 16.

Advantageously, the tube 11 is provided with a rotary drive device (not shown) having two adjustable ends of stroke, so as to be able to adjust firstly a fully rolled-up "high" position in which the support layer 13 and the projection surface 12 are rolled together to a position in which the hem 18 becomes tangential to the rolled-up support layer 13 and projection surface 12, and secondly a "low" position in which the projection surface is completely visible and is suspended from the junction 15, the top portion 13A of the support layer 13 being visible in part and being rolled up in part around the tube 11.

Only the support layer 13 is directly fastened to the tube 11 by means of adhesive or of an adhesive strip 20, extending over the entire width of the support layer 13 at its top edge (FIG. 2).

The support layer 13 always has at least one turn rolled around the tube 11, even when in the low position (FIG. 5), so that the vertical traction force exerted by the weight of the screen and by the weight does not act directly on the fastening between the support layer 13 and the tube 11.

Figure 6:
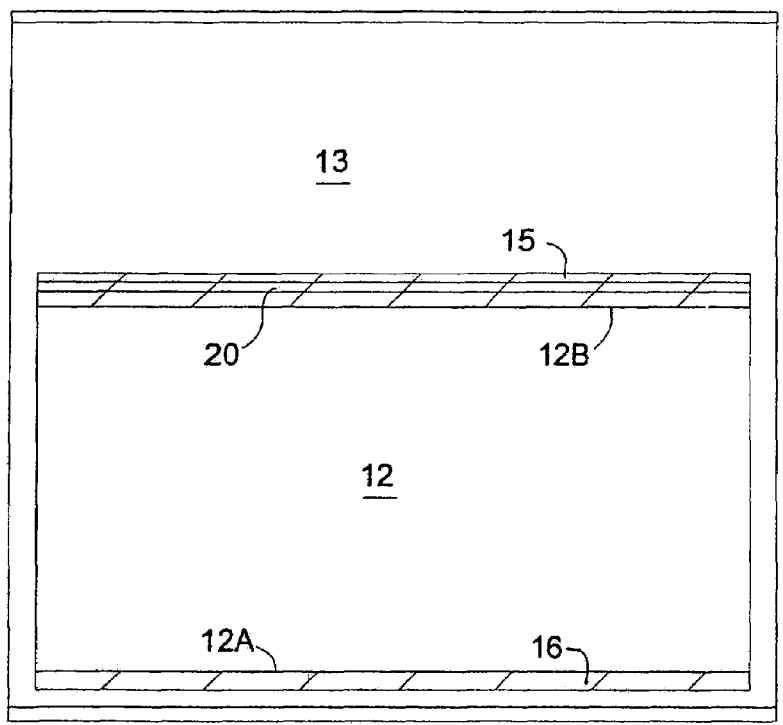
FIG. 6 is a front elevation view of a projection surface mounted on a support layer of the invention in a variant embodiment of the invention.
Figure 7:
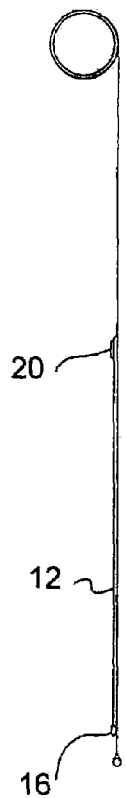
FIG. 7 is a side elevation view of the variant embodiment of the invention corresponding to FIG. 6.
Figure 8:
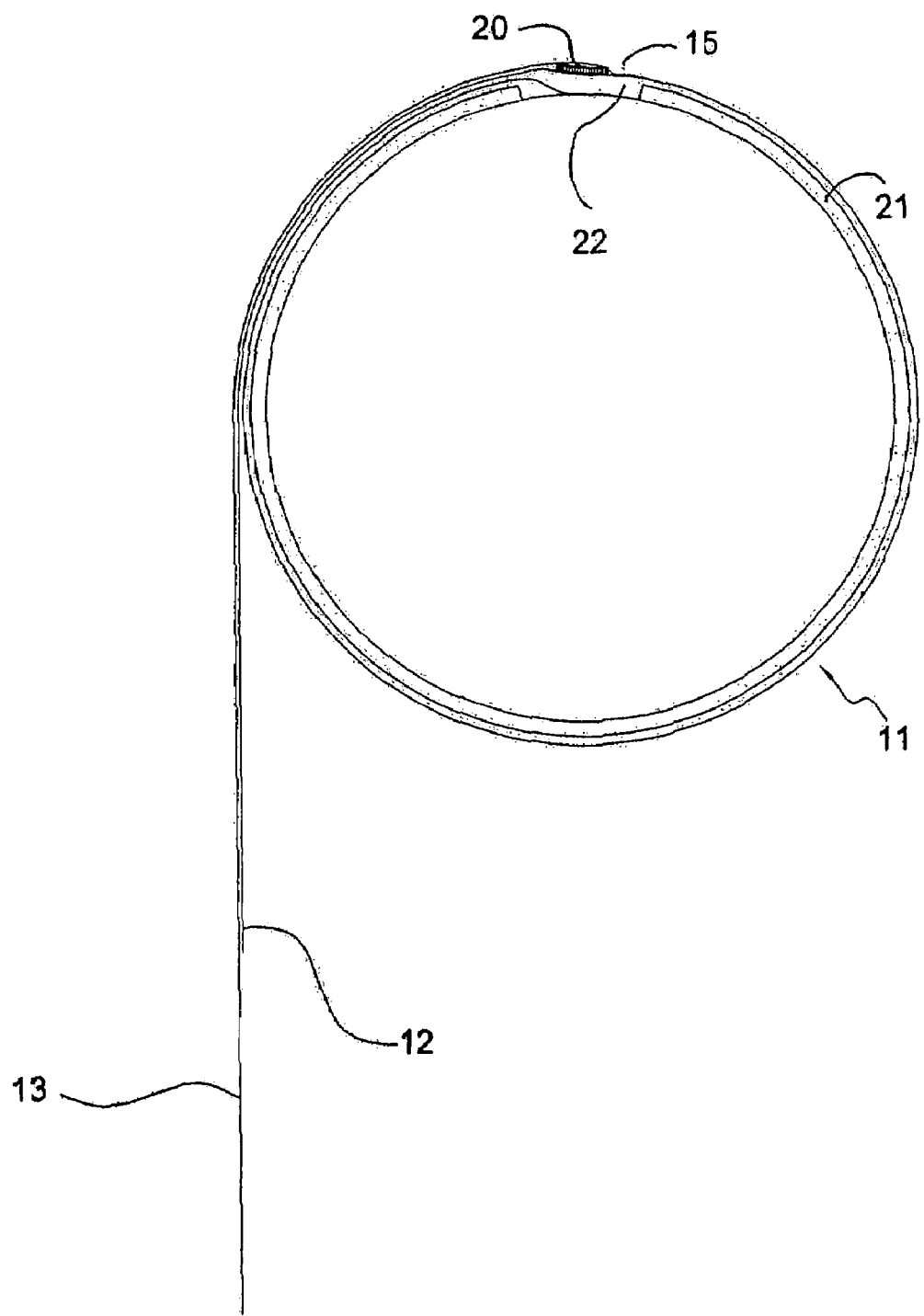
FIG. 8 is a cross-section view through a variant embodiment of the invention.

In a variant embodiment of the invention, shown in FIGS. 6, 7, and 8, a stiffener element 20 constituted by a flat bar extending over the entire width of the projection surface 12 is fastened to the projection surface 12 in a position parallel to the junction 15 and close thereto. Such a stiffener element 20 may be fastened either to the projection surface, or under said surface, i.e. between the projection surface 12 and the support layer 13.

The stiffener element 20 may be a metal rod, or indeed a plastics material rod. Advantageously, its thickness is about 1 mm, but this is not limiting. The width of the stiffener element may be 10 mm, for example, and again this is not limiting.

The stiffener element 20 may be fastened to the projection surface 12 e.g. by adhesive or by any other appropriate means.

In the variant embodiment described, the strip 12B extends vertically in such a manner as to cover simultaneously the junction 15, the stiffener element 20, and the space between the junction 15 and the stiffener 20. As a result, the change in appearance between the projection surface 12 and the stiffener element 20 lies outside the projection zone. Furthermore, this difference is masked by the substantially black color of the strip 12B.

With reference to FIG. 8, a sleeve 21 preferably surrounds the roll-up tube and extends over the entire length of the tube or at least over an axial length of the tube that is equal to the width of the support layer 13. The sleeve 21 presents thickness that is substantially equal to or slightly greater than the combined thickness of the junction 15 plus the stiffener element 20. This sleeve is interrupted in a portion of its periphery so as to define a recess 22. The recess 22 extends axially along the tube 11.

The recess 22 lies in an angular position such that the junction 15 and the stiffener element 20 occupy the recess 22 when the screen is rolled up. The recess 22 is thus suitable for compensating the extra thickness provided by the junction 15 and the stiffener element 20. This avoids the combined thickness of the junction 15 plus the stiffener element 20 masking the sheet 12 and the support layer 13 on each occasion they are rolled up.

The embodiment described in the present description is a non-limiting example of the invention, which is itself defined by the following claims.

What is claimed is:

1. A projection screen comprising firstly a support layer, of substantially black color, suitable for rolling onto a roll-up tube and including a weight at its bottom edge, and secondly a projection surface that is substantially white or pale gray, of smaller height and smaller width than said support layer, which projection surface is fastened to the support layer via a junction at its top edge and overlies the face of the screen that is to receive projection, wherein a projection zone is defined on said projection surface by two horizontal strips located respectively at the bottom and at the top of the projection surface, and by side edges of the projection surface.

2. A projection screen according to claim 1, wherein said junction extends across the entire width of the top edge of the projection surface.

3. A projection screen according to claim 1, wherein the positioning of the projection surface relative to the support layer is such that the bottom edge of the support layer lies perceptibly lower than the bottom edge of the projection surface when the screen is unrolled.

4. A projection screen according to claim 1, wherein the support layer is substantially taller than the projection surface, such that only said support layer connects the projection screen with the roll-up tube when said screen is unrolled.

5. A projection screen comprising firstly a support layer, of substantially black color, suitable for rolling onto a roll-up tube and including a weight at its bottom edge, and secondly a projection surface that is substantially white or pale gray, of smaller height and smaller width than said support layer, which projection surface is fastened to the support layer via a junction at its top edge and overlies the face of the screen that is to receive projection, wherein each of the support layer and the projection surface includes a respective weight extending across its entire width and wherein said projection surface includes a weight that is lighter than the weight of said support layer.

6. A projection screen according to claim 5, wherein the weight of the projection surface is of a length that is substantially equal to the width of the bottom edge of the projection surface, and presents an oblong cross-section that is constant along its entire length and of thickness that does not exceed three millimeters.

7. A projection screen comprising firstly a support layer, of substantially black color, suitable for rolling onto a roll-up tube and including a weight at its bottom edge, and secondly a projection surface that is substantially white or pale gray, smaller in size than said support layer, which projection surface is fastened to the support layer via a junction at its top edge and overlies the face of the screen that is to receive projection, wherein the projection surface is provided with a stiffener element extending over the entire width of said projection surface and wherein a sleeve is provided surrounding the tube, said sleeve being interrupted over a portion of its perimeter in such a manner as to define a recess extending axially along the tube, said recess being suitable for compensating for the extra thickness provided by the junction and the stiffener element.

8. A projection screen according to claim 7, wherein said projection surface is of smaller height and smaller width than said support layer.

\* \* \* \* \*